United States Patent
To et al.

(10) Patent No.: US 7,860,634 B2
(45) Date of Patent: Dec. 28, 2010

(54) METHOD AND APPARATUS FOR IDENTIFICATION OF WHEELS OF A VEHICLE AND A VEHICLE COMPRISING SAME

(75) Inventors: Kwan Wai Raymond To, Hong Kong Sar (CN); Lap-Wai Lydia Leung, Hong Kong Sar (CN); Ziyang Gao, Hong Kong Sar (CN); Man Lung Ivan Sham, Hong Kong Sar (CN); Chang Hwa Chung, Hong Kong Sar (CN)

(73) Assignee: Hong Kong Applied Science and Technology Research Institute Co., Ltd., Hong Kong Sar (CN)

( * ) Notice: Subject to any disclaimer, the term of this patent is extended or adjusted under 35 U.S.C. 154(b) by 751 days.

(21) Appl. No.: 11/905,038

(22) Filed: Sep. 27, 2007

(65) Prior Publication Data
US 2009/0088939 A1 Apr. 2, 2009

(51) Int. Cl.
*B60C 23/04* (2006.01)
*G06F 19/00* (2006.01)

(52) U.S. Cl. .............................. 701/72; 701/2; 701/33; 340/442; 340/477

(58) Field of Classification Search .................. 701/72, 701/2, 33; 340/444, 442, 438, 477; 73/146
See application file for complete search history.

(56) References Cited

U.S. PATENT DOCUMENTS

| | | | |
|---|---|---|---|
| 5,600,301 A | 2/1997 | Robinson, III | |
| 6,204,758 B1 | 3/2001 | Wacker et al. | |
| 6,684,691 B1 * | 2/2004 | Rosseau | 73/146 |
| 7,010,968 B2 | 3/2006 | Stewart et al. | |
| 7,023,334 B2 | 4/2006 | Fischer et al. | |
| 7,227,458 B2 * | 6/2007 | Watabe et al. | 340/447 |
| 7,778,741 B2 * | 8/2010 | Rao et al. | 701/1 |
| 2003/0197603 A1 * | 10/2003 | Stewart et al. | 340/442 |

* cited by examiner

*Primary Examiner*—Tan Q Nguyen
(74) *Attorney, Agent, or Firm*—Buchanan Ingersoll & Rooney PC

(57) ABSTRACT

A method of determining the location information of a plurality of wheels mounted on a vehicle by obtaining a relationship between the lateral location of a wheel and the polarity of a transverse acceleration transmitted by an accelerometer of a wheel in response to a lateral turn of the vehicle in a direction of a lateral side of the vehicle and determining the lateral location of a wheel with reference to the polarity of the transverse acceleration signal transmitted by the accelerometer of the wheel upon the vehicle undergoing a lateral turn.

25 Claims, 3 Drawing Sheets

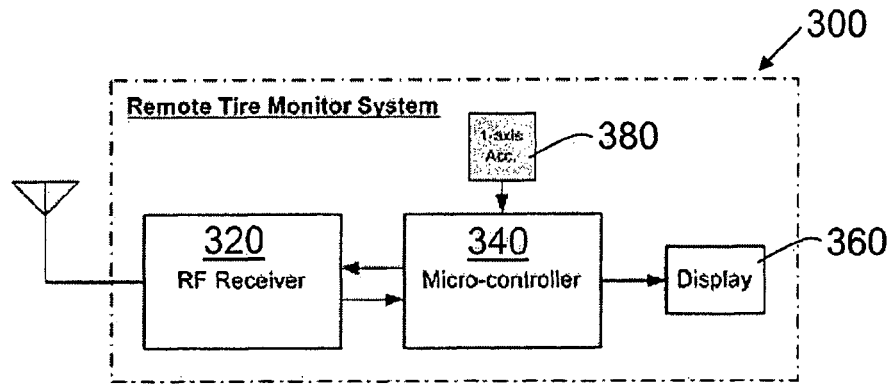
Figure 3
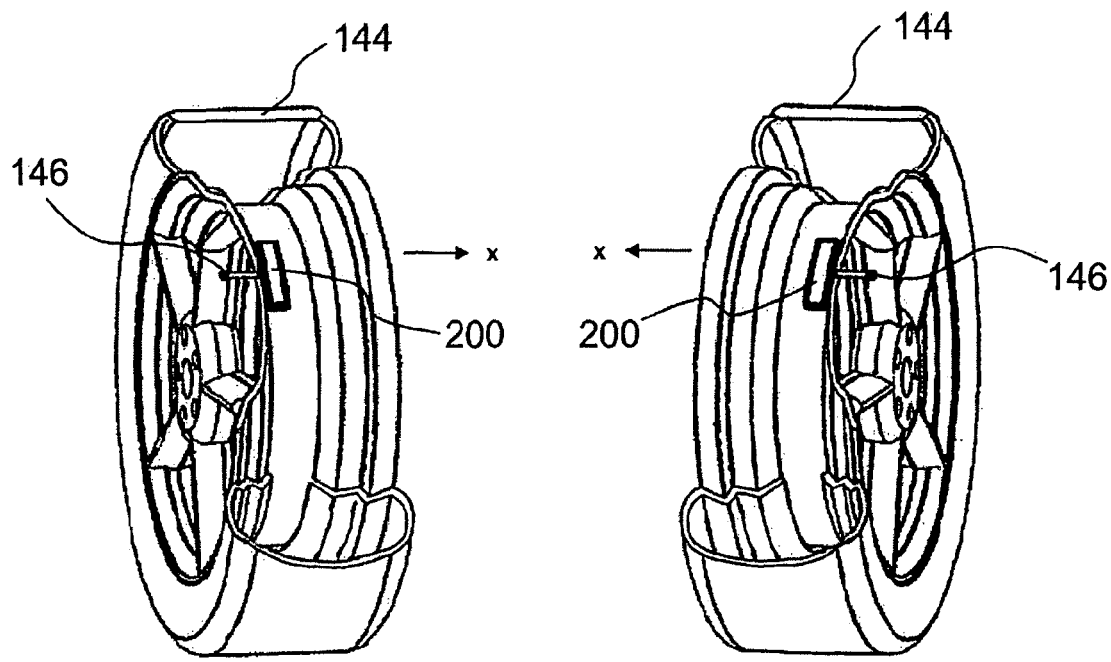
Figure 4A
Figure 4B

METHOD AND APPARATUS FOR IDENTIFICATION OF WHEELS OF A VEHICLE AND A VEHICLE COMPRISING SAME

FIELD OF THE INVENTION

The present invention relates to methods and apparatus for identifying wheels of a vehicle, and also to a vehicle comprising such methods and apparatus.

BACKGROUND OF THE INVENTION

Identification of wheels of a vehicle provides useful information on the operation or operation conditions of a road-going vehicle. For example, a tire pressure monitoring system (TPMS) for a road-going vehicle requires wheel identification means to identify the identity of each of the wheels in order to provide pressure information on each individual wheel of a vehicle.

Wheel identification means are known. For example, U.S. Pat. No. 5,600,301 has disclosed a wheel identification means in which each vehicle wheel has a transmitter with a unique code. A central receiver in the vehicle is taught, at manufacture, to recognize the codes for the respective transmitter for the vehicle. However, such an arrangement requires an application specific integrated circuit (ASIC) encoder in a transmitter which is programmed at manufacture to give individual identity to the wheel. The requirement of an ASIC to operate the arrangement has severely limited the usefulness of such a means, for example, due to the non-exchangeability of wheels among manufacturers of wheels.

U.S. Pat. No. 6,204,758 teaches a tire monitor for use in a remote tire monitor system including an accelerometer for detecting acceleration of the tire monitor as attached to the individual wheels. However, this arrangement requires the use of a radial accelerometer, a tangential accelerometer, and a YAW accelerometer in order to determine the positional information of the individual wheels.

U.S. Pat. No. 7,023,334 teaches a method for assigning tire pressure measurement devices in a motor vehicle. The method comprises determining by means of ABS when a vehicle is making a turn whether it is a left-hand or right-hand. Wheel revolution counts are then measured in each tire and sent along with identification codes to a central analysis unit. There, the wheel revolution counts are collated with the bend data determined by the ABS. The higher wheel revolution counts are then assigned to the side of the vehicle on the outside of the bend and the two lower wheel vehicle counts are assigned to the other side of the vehicle. Such a system requires an ABS unit as well as identification codes.

U.S. Pat. No. 7,010,968 has described a tire monitoring system for use in conjunction with a remote tire monitoring system of a vehicle including a dual-axis accelerometer and a control circuit. The control circuit determines position information such as the right/right position of a tire monitor on the vehicle in response to an acceleration signal from the dual-axis accelerometer. The control unit further identifies additional positional information such as front/rear position of a transmitting time monitor by detecting signal strength of signal transmission.

Known wheel identification means or arrangement is not entirely satisfactory. It is therefore desirable to provide a wheel identification means which alleviates shortcomings of known wheel identification means or at least provide an alternative wheel identification means for the choice of the public.

SUMMARY OF THE INVENTION

According to the present invention, there is provided a method of determining the location information of a plurality of wheels mounted on a vehicle, each said wheel having a plane of rotation and said vehicle comprising a body having a first and a second lateral side, the method comprising the steps of attaching an accelerometer to each one of said plurality of wheels of said vehicle, wherein each said accelerometer is adapted to transmit a transverse acceleration signal in response to acceleration in a direction orthogonal to the plane of rotation of a said wheel, the polarity of a said transverse acceleration signal transmitted by a said accelerometer mounted on one said lateral side of said vehicle being opposite to the polarity of another said transverse acceleration signal transmitted by another said accelerometer mounted on another said lateral side of said vehicle upon said vehicle making a lateral turn towards either said first or said second lateral side to change its course of motion; obtaining a relationship between the lateral location of a said wheel and the polarity of said transverse acceleration signal transmitted by a said accelerometer of a said wheel in response to a lateral turn of said vehicle in a direction of a said lateral side of said vehicle; and determining the lateral location of a said wheel with reference to the polarity of said signal acceleration signal transmitted by said accelerometer of said wheel upon the vehicle undergoing a said lateral turn. By attaching an accelerometer which is arranged to detect transverse acceleration of a wheel and which outputs a transverse acceleration signal having a polarity dependent on the direction of lateral turn as well as its own lateral location, the lateral location of a wheel can be determined with more ease.

In another aspect, the present invention has described a method of determining the location information of a plurality of wheels mounted on a vehicle, said vehicle comprising a body having a first and a second lateral side, the method comprising the steps of obtaining transverse acceleration information of each one of said plurality of wheels upon said vehicle making a lateral turn to change its course of motion towards either said first or said second lateral side, said transverse acceleration being in a direction orthogonal to the plane of rotation of a said wheel, and said transverse acceleration information containing orientation information of said transverse acceleration relative to the body of said vehicle and including information on whether said transverse acceleration is in a direction towards or away from said body of said vehicle; and determining whether a said wheel is on said first or said second lateral side of said vehicle with reference to the direction of said lateral turn and said orientation information.

According to a preferred embodiment of the present invention, there is provided a wheel identification arrangement for a vehicle comprising a plurality of wheels mounted on a first lateral side and a second lateral side of the body of said vehicle, said arrangement comprising a processor and a plurality of wheel identification devices each of which is attached respectively to said plurality of wheels; wherein each said wheel identification device comprises an accelerometer arranged to generate a transverse acceleration signal in response to acceleration in a direction orthogonal to the plane of rotation of said wheel, said transverse acceleration signal containing orientation information of whether said transverse acceleration is towards or away from the body of said vehicle; and a wireless signal transmitter for transmitting said acceleration signal to said processor; wherein said processor is arranged to determine the lateral locations of said wheels from the polarity of said orientation information.

According to a further aspect of the present invention, there is provided a wheel identification arrangement for a vehicle comprising a plurality of wheels mounted on a first lateral side and a second lateral side of the body of said vehicle, said arrangement comprising a processor and a plurality of wheel identification devices each of which is attached respectively to said plurality of wheels; wherein each said wheel identification device comprises an accelerometer arranged to generate a transverse acceleration signal in response to acceleration in a direction orthogonal to the plane of rotation of said wheel, said transverse acceleration signal containing magnitude information indicating the magnitude of transverse acceleration of a said wheel relative to the body of said vehicle; and a wireless signal transmitter for transmitting said acceleration signal to said processor; wherein said processor is arranged to determine whether a wheel is steerable from said magnitude information.

According to yet another aspect of the present invention, there is provided a method of identifying steerable wheels of a vehicle comprising a plurality of wheels, each said wheel having a plane of rotation and said vehicle comprising a body having a first and a second lateral side, the method comprising the steps of attaching an accelerometer to each one of said plurality of wheels of said vehicle, wherein each said accelerometer is adapted to transmit a transverse acceleration signal in response to acceleration in a direction orthogonal to the plane of rotation of a said wheel, said transverse acceleration signal containing magnitude information indicating the magnitude of transverse acceleration of a said wheel relative to the body of said vehicle; and determining whether a wheel is steerable with reference to said magnitude information.

BRIEF DESCRIPTION OF THE DRAWINGS

Exemplary embodiments of the present invention will be explained in further detail below by way of example and with reference to the accompanying drawings, in which:

FIG. 3 is a block diagram illustrating a central controller unit which is attached to the body of a vehicle installed with a wheel identification means of FIG. 1, FIGS. 4A and 4B respectively depict a left-side wheel and a right-side wheel each attached with a tire pressure monitoring device (TPMD) on one lateral side of a wheel.

DETAILED DESCRIPTION OF THE PREFERRED EMBODIMENTS

Figure 1:
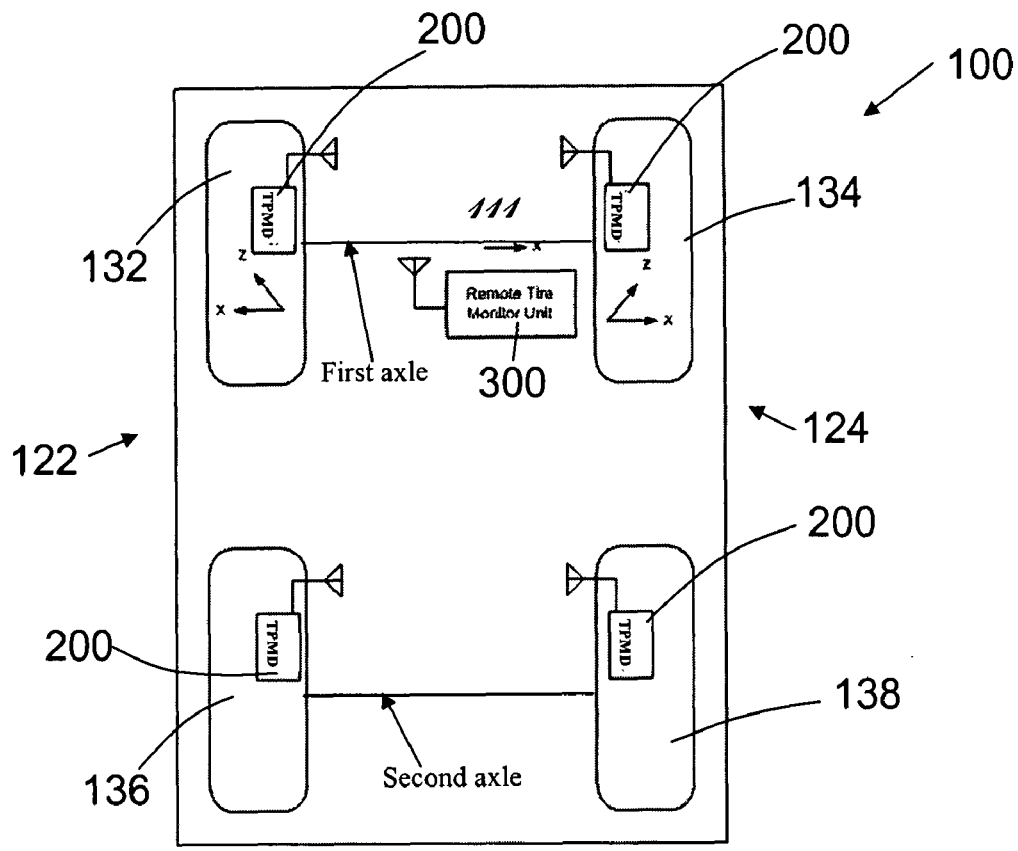
FIG. 1 is a schematic diagram depicting a vehicle comprising a plurality of wheels each attached with a wheel identification means forming part of a TPMS.

FIG. 1 depicts a vehicle 100 comprising a body 120 and a plurality of ground engaging wheels 132, 134, 136, 138 mounted on the first 122 and second 124 lateral sides of a body. The wheels are rotatably mounted on the body and each of the wheels has a plane of rotation, which is usually orthogonal to the road engaging surface of a tire of the wheel. Specifically, the plurality of wheels comprises a first wheel 132 and a second wheel 134 mounted respectively on the front left side and front right side of the body, and a third 136 and a fourth 138 wheel mounted respectively on the rear left side and rear right side of the body. The first and second wheels are mounted on the front axle and are operable through the control of a steering wheel on the steering column of a vehicle to change its course of motion. The course of motion is changeable by steering the first and second wheels towards the first or the second lateral side, that is, respectively to the left and the right side in this example. The third and fourth wheels share a common rotational axis, with their rotation planes always in parallel to the longitudinal axis of the vehicle. Each of the wheels comprises a rim 142, for example, an alloy rim, and an inflatable tire 144 which is inflatable to an appropriate or specified tire pressure as is known to persons skilled in the art.

To provide information on operation conditions of the individual wheels of the vehicle, a tire pressure monitoring device (TPMD) 200 is attached to each one of the wheels. Each TMPD is attached to one lateral side of the wheel, and more particularly, near the outside edge of the wheel which is proximal the valve stem 146. The valve stem, being metallic, also serves as an antenna to facilitate wireless communication between a central processor installed on the vehicle and a TPMD mounted on a wheel. To collect and process data transmitted by the TPMD attached to individual wheels, a central controller unit (CCU) 300 is mounted on the body of the vehicle. The CCU 300 also comprises an optional accelerometer to detect a lateral turn of the vehicle to be explained below.

Figure 2:
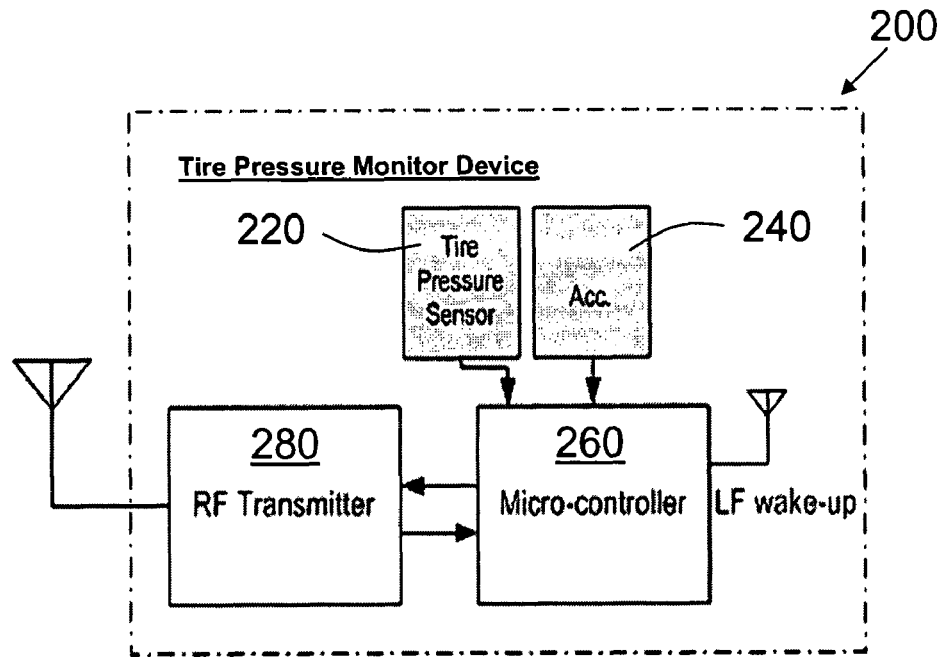
FIG. 2 is a block diagram depicting a tire pressure monitoring device unit for attaching to a ream of a wheel.

As shown in FIG. 2, each TPMD comprises a tire pressure sensor 220 and a wheel identification device including an accelerometer 240 connected to a micro-controller 260. The micro-controller is connected to a low frequency (LF) wake-up arrangement which is arranged to provide wake-up signals to the micro-controller as well as being a source of wireless power. A radio-frequency (RF) transmitter 280 is connected to the micro-controller to facilitate wireless communication with the CCU. Data generated by a TMPD will be transmitted to the CCU for processing. The tire pressure sensor can be a conventional or a standard device unit, such as, for example, a piezoelectric sensor, which is arranged to generate pressure variable information or data, in the form of electrical signals, to indicate the instantaneous pressure within the inflation chamber of the tire. The accelerometer is configured to detect lateral acceleration, that is, acceleration in a direction which is orthogonal to the plane of rotation of a wheel to which it is attached, and can be a single-axis accelerometer the operation axis of which is orthogonal to the plane of rotation of the wheel.

The arrangement of the CCU and the TPMDs collectively form a tire pressure monitoring system (TPMS) of the vehicle. As shown in FIG. 3, the central controller 300 of the TPMS comprises a radio-frequency (RF) receiver 320 for receiving data transmitted by the RF transmitter of the individual TPMDs, a micro-controller unit 340 connected to the RF receiver, and a visual display unit (VDU) 360 arranged to receive information from the micro-controller unit and to provide visual information to a user, especially a driver. An optional accelerometer 380, which is arranged to detect a change of the course of motion of the vehicle, is mounted on the body with its output terminals connected to the micro-controller. The accelerometer 380 can be a single-axis accelerometer which is arranged to detect acceleration in a direction orthogonal to the longitudinal axis of the body of the vehicle. Since a steering turn is primarily a turn about the centre of a turning circle, the accelerometer is primarily arranged to detect centrifugal acceleration of the vehicle upon change in the course of motion of the vehicle towards either the left or right lateral sides of the vehicle. To provide automated reference, the accelerometer of the CCU is configured to detect acceleration of the vehicle in a direction orthogonal to a straight course of motion, which is equivalent to acceleration in a direction orthogonal to the rotational planes of the third and fourth wheels. Such a direction is labelled x-direction in the Figures and specification for brevity and convenience.

An exemplary accelerometer suitable for use in the present application of FIGS. 1 to 3 is a micro-electro-mechanical system (MEMS) accelerometer 240 depicted in FIG. 4. The MEMS comprises a movable member 242 positioned intermediate a pair of fixed integers, namely, a fixed first finger 244 and a fixed second finger 246. The movable member is conductive and is arranged to be movable along its operation axis, the x-axis of FIG. 4 labelled with a negative and positive mark, when attached to a wheel. To be adapted for measuring or detecting acceleration in the x-axis, which is in a direction orthogonal to the plane of rotation of the wheel, the accelerometer is arranged so that its operational axis A-A' is orthogonal to the plane of rotation of the wheel. As can be inferred from the Figures, when the movable member moves in the x-direction due to acceleration in the x-direction, the distance of separation between the respective fixed fingers and the movable member will change. Specifically, the capacitance ($C_1$) between the first finger and the movable member, and the capacitance ($C_2$) between the second finger and the movable part, will also change as a result. For example, capacitance $C_1$ will increase when the movable member moves closer towards the first finger, while capacitance $C_2$ will decrease as a result of such a lateral displacement of the moveable part, since the movable member is now more distant from the second finger.

By monitoring the variation in capacitance $C_1$ and $C_2$, the direction or vector of acceleration, including the orientation of whether the acceleration is in a direction towards or away from the first or second fingers, could be ascertained. The difference in capacitance ($\Delta C = C_1 - C_2$) could be utilised to generate transverse acceleration information comprising orientation information indicating whether the transverse acceleration is towards the second finger or the first finger in the manner to be explained below.

An exemplary attachment of a tire pressure monitoring device (TPMD) of FIG. 2, including a wheel identification device, is shown in FIGS. 4A and 4B. In this arrangement, a TPMD is attached on an outer side of the wheel proximal the valve stem, with the operational axis A-A' of the accelerometer (MEMS) orthogonal to the rotational plane of the wheel so that acceleration in a direction transverse to the plane of rotation of the wheel can be monitored. More particularly, each accelerometer is attached to a wheel so that the spatial orientation and relationship of an accelerometer relative to the valve stem or the outer edge of a wheel is identical for the plurality of wheels. Specifically, each accelerometer is attached so that either the first or second finger is proximal the valve stem or the outer edge of the wheel. With this arrangement, a change in capacitance, or relative capacitance between the first- and second-fingers, would provide an indication of whether detected acceleration in the x-axis is towards or away from the stem valve side or the outer side of the wheel to which it is attached. This provides information on whether the x-axis acceleration is towards or away from the vehicle body. By adopting a constant, non-symmetrical, spatial relationship between the fingers of the accelerometer and a lateral side, say the outer side, of the wheel, the wheels will be exchangeable with the lateral locations of the wheels readily identifiable in a manner as explained below.

Figure 5:
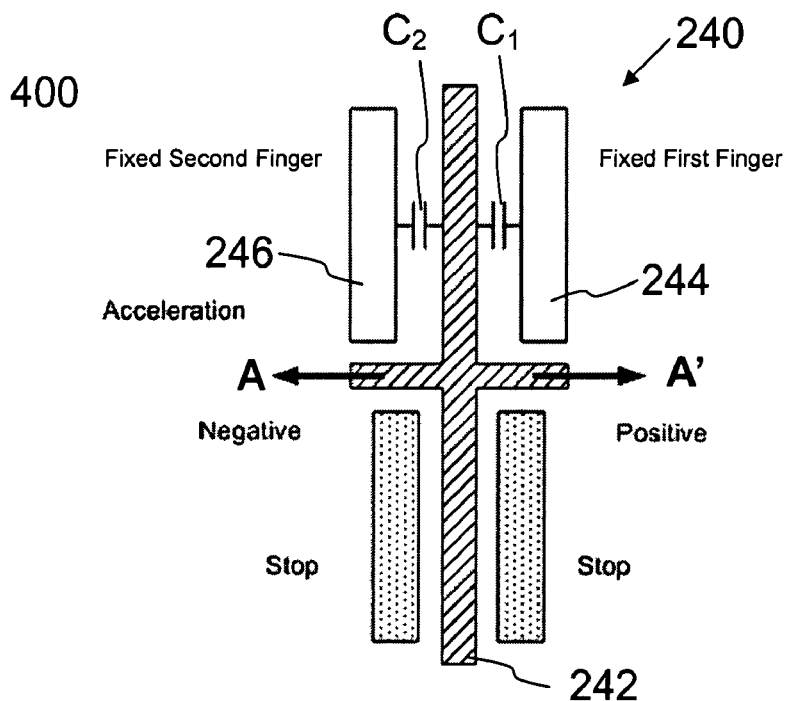
FIG. 5 depicts an exemplary 1-axis accelerometer for use in the present invention.

Assuming that an accelerometer of FIG. 5 is now installed on a left side of the vehicle of FIG. 1 as shown in FIG. 4A, with the second finger proximal to the valve stem, the first finger distal from the valve stem, and its operation axis transverse to the plane of rotation of the wheel as indicated by the arrows, centrifugal force due to a lateral turn of the vehicle towards the right side will drive the movable member to move towards the left side, that is, towards the second finger, thereby increasing the capacitance of the second finger and at the same time decreasing the capacitance of the first finger. Assuming $C_1$ and $C_2$ are equal in the neutral position of the movable member, $\Delta C$ will be negative.

On the other hand, when the vehicle undergoes a lateral turn towards the left side, the resulting centrifugal force will drive the movable member towards the first finger, thereby increasing the capacitance $C_1$ while decreasing the capacitance $C_2$. In such a case, $\Delta C = C_1 - C_2$ is positive. Hence, the direction of a lateral turn of the vehicle can be ascertained by monitoring the difference in capacitance output taken between the first and second fingers. Furthermore, it will be noted that the polarity of the output electrical signals, as signified by the differential capacitance, will undergo a reversal in polarity when the vehicle makes a lateral turn firstly towards a first lateral direction and then towards a second lateral direction.

When an accelerometer of FIG. 5 is installed on a right side of the vehicle of FIG. 1 as shown in FIG. 4B, again with the second finger proximal to the valve stem, the first finger distal from the valve stem, and its operation axis transverse to the plane of rotation of the wheel as indicated by the arrows, centrifugal force due to a lateral turn of the vehicle towards the right side will drive the movable member towards the left, first, finger, thereby increasing the capacitance $C_1$ while decreasing the capacitance $C_2$, resulting in a positive $\Delta C$. On the other hand, when the vehicle undergoes a lateral turn towards the left side, the resulting centrifugal will drive the movable member to move towards the right, second, finger, thereby increasing the capacitance $C_2$ while decreasing the capacitance $C_1$, resulting in a negative $\Delta C$. Since the variation in capacitance between the first and second fingers and the movable member in response to a lateral turn of the vehicle is dependent the direction of the lateral turn, as well as whether a wheel is mounted on the left- or right-lateral side as described above, the identity of whether a wheel is mounted on the right- or left-side will be ascertainable by monitoring a pattern of difference capacitance output in response to a turn.

The lateral location of a wheel can be determined with reference to the polarity of the transverse acceleration signals (TAS) generated by the accelerometer upon the vehicle undergoing a lateral turn on in the manner below.

For example, if the accelerometer is installed on a left wheel and arranged so that the polarity of transverse acceleration signal (e.g. $\Delta C$) towards the left side is positive, a wheel transmitting a positive transverse acceleration signal (TAS) will be identified as a wheel mounted on the left side, while a wheel transmitting a negative TAS will be identified as a wheel on the right side of the vehicle. In such an arrangement, the accelerometers are arranged so that acceleration away from the vehicle body is positive, while acceleration towards the vehicle is negative.

A significant characteristic of an accelerometer of FIG. 5 is that the polarity of the difference electrical signals generated by the first and second wheels in response to a lateral turn of the vehicle is opposite, and this is because the acceleration or operation axis of the accelerometer is reversed by 180 degrees when mounted on opposite lateral sides of the vehicle.

Hence, by measuring the variation in capacitance (ΔC) between the first and second fingers, the polarity or orientation of acceleration can be ascertained by the micro-processor of the CCU or the TPMUs with reference to the pre-determined pattern outlined above and to determine lateral location of a wheel.

As an optional feature, the differential capacitance between the left and right fingers can be further utilized to provide more accurate and sensitive information on the magnitude of transverse acceleration.

By disposing an accelerometer on one side of the wheel with its operation axis in a fixed spatial relationship to the wheel or valve stem in the above manner, the operational axis of an accelerometer will be reversed by 180 degrees when a wheel is moved from one lateral side of the vehicle to another lateral side. Thus, the polarity of an acceleration signal generated by the accelerometer will be reversed by 180 degrees upon repositioning of a wheel from one lateral side to the other, opposite lateral side. With such an arrangement, an accelerometer will indicate whether the transverse acceleration is towards or away from the body, independent on the actual physical identity of the wheel.

The operation of the TMPS will now be explained with reference to the Figures.

Figure 6:
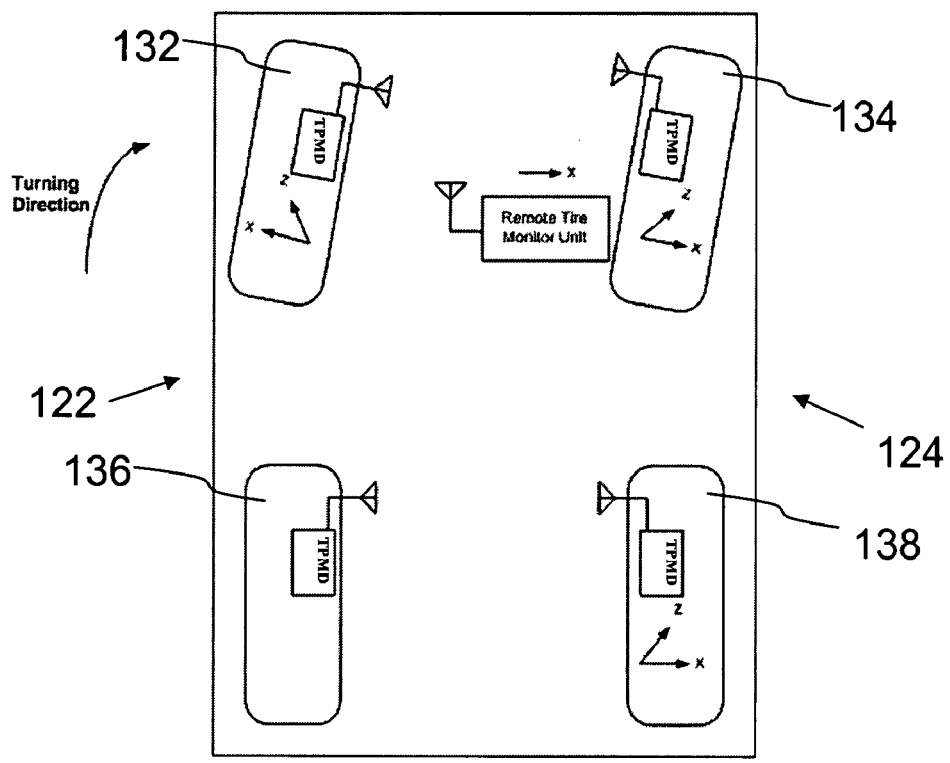
FIG. 6 shows schematically steering of a first and second wheel of the vehicle to change the course of motion of the vehicle of FIG. 1.

When wheels installed with the aforementioned TMPDs are attached to the vehicle, centrifugal force generated in response to a turn of the vehicle towards one lateral side (corresponding to a transverse acceleration towards that lateral side), will cause the moveable member of the accelerometer to move towards the other, opposite, lateral side. Specifically, when the vehicle undergoes a lateral turn towards the right lateral side as shown in FIG. 6 (corresponding to a transverse acceleration towards the right lateral side of the vehicle), the moveable member of the accelerometer will move towards the left lateral side. For a wheel on the left lateral side of the vehicle, this translates into a movement of the moveable member along the operation axis away from the longitudinal axis of the body and the transmission of a negative ΔC to the CCU. For a wheel on the right lateral side of the vehicle, the same turn will translate into a movement of the moveable member along the operation axis but towards the longitudinal axis of the body.

When the vehicle undergoes a lateral turn towards the left lateral side, centrifugal force generated in response to the turn will move the moveable member of the accelerometers towards the right lateral side. For a wheel on the left lateral side of the vehicle, this translates into a movement of the moveable member towards the longitudinal axis of the body and the generation of a positive ΔC. For a wheel on the right lateral side of the vehicle, the same turn will translate into a movement of the moveable member away from the longitudinal axis of the body.

From the above, it will be appreciated that the lateral location of a wheel mounted with a TPMD of this invention can be ascertained by monitoring the orientation of transverse acceleration of the accelerometer with respect to the longitudinal axis of the body as follows.

For example, the lateral location of a wheel is identified or assigned as a wheel on a lateral side, If, upon a turn of a vehicle towards a lateral side of the vehicle, the transverse acceleration of a wheel is in a direction away from the body of the vehicle. This corresponds to a movement of the moveable member of the accelerometer away from the body of the vehicle.

In addition or as an alternative, the lateral location of a wheel is identified or assigned as a wheel on a lateral side, If, upon a turn of a vehicle towards a lateral side of the vehicle, the transverse acceleration of a wheel is in a direction towards the body of the vehicle. This corresponds to a movement of the moveable member of the accelerometer away from the body of the vehicle.

In further addition or as a further alternative, the lateral location of a wheel is identified or assigned as a wheel on a lateral side, If, upon a turn of a vehicle towards an opposite lateral side of the vehicle, the transverse acceleration of a wheel is in a direction away from the body of the vehicle. This corresponds to a movement of the moveable member of the accelerometer towards the body of the vehicle.

Although it is possible to ascertain the direction of lateral turn of a vehicle with reference to the direction of a steering turn of a steering wheel on the steering column, an additional or optional accelerometer mounted on the vehicle with its operation axis orthogonal to the longitudinal axis of the vehicle will provide a useful reference to facilitate an optional feature of automated calibration for a stand alone system.

Referring to FIGS. 1, 3 and 5, an accelerometer of FIG. 5 is mounted on the body of the vehicle with its operation axis orthogonal to the longitudinal axis of the vehicle and the second finger on the left side. With the installation of the accelerometer, acceleration in a lateral direction orthogonal to the longitudinal axis of the vehicle can be monitored. Specifically, when the vehicle makes a lateral turn in the direction of the right lateral side as shown in FIG. 6, the accelerometer mounted on the body will detect a lateral acceleration towards the right lateral side, and this means a movement of the moveable member of the accelerometer towards the left lateral side of the vehicle and towards the second fixed finger. With such an arrangement, an increased capacitance of the second fixed finger or a negative ΔC will mean a lateral turn of the vehicle towards the right lateral side, and a positive ΔC would mean a left turn.

Alternatively, the accelerometer can be installed with the fixed finger mounted in a reversed relationship, that is, with the first integer mounted on the left side of the vehicle body and the second integer on the right side of the vehicle. With such an arrangement, an increased capacitance of the first fixed finger as a positive ΔC will mean a lateral turn of the vehicle towards the right lateral side and vice versa and a negative ΔC would mean a left turn.

By correlating the above directional characteristics of the accelerometer on the vehicle with that of individual accelerometers on the wheels, the lateral locations of each of the plurality of wheels can be determined or ascertained. For example, if the accelerometer mounted on the body is mounted with the second finger on the left side of the vehicle, and an accelerometer is mounted with the second finger on the outer side of the wheel proximal to the valve stem, a left lateral turn of the vehicle will result in an increase in the capacitance of the first finger of the accelerometer of the vehicle (+ΔC), an increase in the capacitance of the first finger of the accelerometer of a wheel on the left side (+ΔC), but a decrease in the capacitance of the first finger of the accelerometer of a wheel on the right side (−ΔC), due to a transverse acceleration towards the left side. In such an arrangement, a positive signal from a wheel would mean that the wheel is on the left side, and the wheel generating a negative signal is a wheel on the right side.

By assigning the polarity of the vehicle polarity to be the same as one of the first and second wheels, the processor in the CCU could readily ascertain on which side is a wheel mounted. For example, if the polarity of the accelerometers attached to the second and fourth wheels is configured to be the same as that of the vehicle accelerometer, turning or steering information of the same polarity would mean that the tires are on the right side of the vehicle. Likewise, turning motion signals of an opposite polarity would indicate that the wheels are either the first or third wheels on the left side of the vehicle.

Each of the third and fourth wheels is attached with a wheel identification device similar to that attached to the first and the second wheels, with the polarity of x-direction acceleration signals generated by the third wheel the same as that of the first wheel, and the polarity of the fourth wheel the same as that of the second wheel.

Alternatively, if the accelerometer on the vehicle body is mounted with the first finger on the left side of the vehicle, and an accelerometer on a wheel is mounted with the first finger on the outer side of the wheel proximal to the valve stem, a left lateral turn of the vehicle will result in an increase in the capacitance of the second finger of the accelerometer of the vehicle ($-\Delta C$), an increase in the capacitance of the second finger of the accelerometer of a wheel on the left side ($-\Delta C$), but a decrease in the capacitance of the second finger of the accelerometer of a wheel on the right side ($+\Delta C$).

Since the directional relationship of the trend of change of capacitance can be readily ascertained, whether a wheel is on the left or right side of a vehicle can be readily determinable by the arrangement of this invention with reference to the above relationship.

The present invention also provides a further optional scheme of feature for identifying steerable wheels or distinguishing steerable wheels from non-steerable wheels among the plurality of wheels. A steerable wheel in the present context means a ground engaging wheel of a vehicle the rotational plane of which is moveable relative to the body of the vehicle to change the course of motion of the vehicle.

In the embodiment of FIG. 1, the first and second wheels can be steered to change the course of motion of the vehicle and are referred to as steerable wheels.

It will be noted that when the rotational planes of the first and second wheels are turned for an angular extent relative to the body of the vehicle, the course of motion of the vehicle will be changed. To identify steerable wheels from the plurality of wheels or to distinguish steeerable from non-steerable wheels, the magnitude of TAS is utilized. It will be noted that when first and second wheels are steered, there is a transverse acceleration of each of the first and second wheels relative to the body.

As the third and fourth wheels are not steerable, there is a constant or fixed relationship between the TAS generated by accelerometers of the third and fourth wheels and that generated by the accelerometer of the vehicle. Specifically, there is a constant relationship between the magnitude of the TAS of the third and fourth wheels and the magnitude of the lateral acceleration of the vehicle. As the transverse acceleration of the first and second wheels is independent of the vehicle body, the identity of the third and fourth wheels can be ascertained by comparing the difference in the magnitude of the x-direction acceleration relative to that of the vehicle accelerometer. For example, relative magnitude of transverse acceleration of the first and second wheels would be time variant while that of the third and fourth wheels are time invariant. By identifying wheels with a variable transverse acceleration magnitude relative to the vehicle's lateral acceleration, the steerable wheels attached to the first axle, namely, first and second wheels, can be distinguished from the wheels attached to the second axle, namely, the third and fourth wheels. As wheels attached to the same lateral side of the vehicle has a same polarity, the identity of the individual wheels can be ascertained from the polarity of the x-direction acceleration signals plus the variation in x-direction acceleration with reference to the vehicle.

Thus, by comparing the magnitude of the TAS of the wheels relative to the body, steerable wheels are identifiable.

Furthermore, by combining the above method to identify left- and right-wheels with the method to identify the steerable wheels, the four wheels of a vehicle can be readily identified using 1-axis accelerometer.

It will be appreciated that the present invention can be implemented using a plurality of single axis accelerometers to provide identification information to permit the remote monitoring system to ascertain the individual identity of each of first, second, third and fourth wheels attached to a vehicle. In addition, the present invention is capable of identifying the identity of the individual wheels, regardless whether the vehicle is in forward or reverse motion.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to using a single axis accelerometer, it should be appreciated that the invention can apply, whether with or without modification, by using multiple-axes accelerometer without loss of generality.

The invention claimed is:

1. A method of determining the location information of a plurality of wheels mounted on a vehicle, each said wheel having a plane of rotation and said vehicle comprising a body having a first and a second lateral side, the method comprising the steps of:
    attaching an accelerometer to each one of said plurality of wheels of said vehicle, wherein each said accelerometer is adapted to transmit a transverse acceleration signal in response to acceleration in a direction orthogonal to the plane of rotation of a said wheel, the polarity of a said transverse acceleration signal transmitted by a said accelerometer mounted on one said lateral side of said vehicle being opposite to the polarity of another said transverse acceleration signal transmitted by another said accelerometer mounted on another said lateral side of said vehicle upon said vehicle making a lateral turn towards either said first or said second lateral side to change its course of motion;
    obtaining a relationship between the lateral location of a said wheel and the polarity of said transverse acceleration signal transmitted by a said accelerometer of a said wheel in response to a lateral turn of said vehicle in a direction of a said lateral side of said vehicle; and
    determining the lateral location of a said wheel with reference to the polarity of said transverse acceleration signal transmitted by said accelerometer of said wheel upon the vehicle undergoing a said lateral turn.

2. A method according to claim 1, wherein the polarity of a said transverse acceleration signal transmitted by a said accelerometer contains information on whether said transverse acceleration is towards or away from the body of said vehicle.

3. A method according to claim 1, wherein said method comprises a step of identifying a said wheel as a wheel on a said lateral side of said vehicle if, upon said vehicle making a said lateral turn towards that said lateral side, the polarity of said transverse acceleration signal of said wheel indicates acceleration away from said body.

4. A method according to claim 1, wherein said method comprises a step of identifying a said wheel as a wheel on said first lateral side of said vehicle if, upon said vehicle making a said lateral turn towards said first lateral side, the polarity of said transverse acceleration signal of said wheel indicates acceleration away from said body.

5. A method according to claim 1, wherein said method comprises a step of identifying a said wheel as a wheel on said second lateral side of said vehicle if, upon said vehicle making a said lateral turn towards said first lateral side, the polarity of said transverse acceleration signal of said wheel indicates acceleration towards from said body.

6. A method according to claim 1, wherein said method comprises a step of identifying a said wheel as a wheel on said first lateral side of said vehicle if, upon said vehicle making a said lateral turn towards said second lateral side, the polarity of said transverse acceleration signal of said wheel indicates acceleration towards said body.

7. A method according to claim 1, wherein said method comprises a step of identifying a said wheel as a wheel on said second lateral side of said vehicle if, upon said vehicle making a said lateral turn towards said second lateral side, the polarity of said transverse acceleration signal of said wheel indicates acceleration away from said body.

8. A method according to claim 1, comprising a further step of attaching a reference accelerometer to the body of said vehicle to detect lateral acceleration of said vehicle in a direction orthogonal to the longitudinal axis of said vehicle, said reference accelerometer being arranged to provide reference on the orientation of a said lateral turn of said vehicle.

9. A method according to claim 8, wherein said reference accelerometer is arranged to provide a reference of whether a said lateral turn of said vehicle is in a direction towards said first or said second lateral side of said vehicle.

10. A method according to claim 9, wherein said reference accelerometer is arranged to generate a lateral acceleration signal having a polarity dependent on the direction of a said lateral turn of said vehicle, the method further comprising a step of correlating the polarity of a said transverse acceleration signal transmitted by a said wheel and the polarity of said lateral acceleration signal of said vehicle to determine the lateral location of a said wheel.

11. A method according to claim 1, wherein said plurality of wheels of said vehicle comprises a first plurality of steerable wheels, the method further comprising a step of identifying a said steerable wheel by identifying a said wheel having transverse acceleration relative to the body of said vehicle.

12. A method according to claim 11, wherein said transverse acceleration signal contains information on the magnitude of said transverse acceleration of a said wheel, and said transverse acceleration of a said wheel relative to said vehicle being determined with respect to the difference in magnitude between magnitude of lateral acceleration of said vehicle and the magnitude of said transverse acceleration of said wheel upon said vehicle undergoing a change in its course of motion.

13. A method of determining the location information of a plurality of wheels mounted on a vehicle, said vehicle comprising a body having a first and a second lateral side, the method comprising the steps of:
    obtaining transverse acceleration information of each one of said plurality of wheels upon said vehicle making a lateral turn to change its course of motion towards either said first or said second lateral side, said transverse acceleration being in a direction orthogonal to the plane of rotation of a said wheel, and said transverse acceleration information containing orientation information of said transverse acceleration relative to the body of said vehicle and including information on whether said transverse acceleration is in a direction towards or away from said body of said vehicle; and
    determining whether a said wheel is on said first or said second lateral side of said vehicle with reference to the direction of said lateral turn and said orientation information.

14. A method according to claim 13, wherein said transverse acceleration information contains polarity information indicating the orientation of a said lateral acceleration, the orientation of said lateral transverse acceleration information generated by a said wheel on one said lateral side being opposite to that generated by a said wheel on another lateral side.

15. A method according to claim 13, wherein said transverse acceleration information contains polarity information indicating the orientation of a said lateral acceleration, the orientation of said lateral transverse acceleration information generated by a said wheel in response to a lateral turn of said vehicle towards one said lateral side being opposite to that generated by the same said wheel in response to a lateral turn of said vehicle towards the other said lateral side.

16. A wheel identification arrangement for a vehicle comprising a plurality of wheels mounted on a first lateral side and a second lateral side of the body of said vehicle, said arrangement comprising a processor and a plurality of wheel identification devices each of which is attached respectively to said plurality of wheels; wherein each said wheel identification device comprises:
    i. an accelerometer arranged to generate a transverse acceleration signal in response to acceleration in a direction orthogonal to the plane of rotation of said wheel, said transverse acceleration signal containing orientation information of whether said transverse acceleration is towards or away from the body of said vehicle; and
    ii. a wireless signal transmitter for transmitting said acceleration signal to said processor;
    wherein said processor is arranged to determine the lateral locations of said wheels from the polarity of said orientation information.

17. A wheel identification arrangement according to claim 16, wherein the orientation information generated by a said accelerometer of a said wheel on said first lateral side has an opposite polarity to that generated by a said accelerometer of a said wheel on said second lateral side in response to a lateral turn of said vehicle.

18. A wheel identification arrangement according to claim 16, wherein said processor is arranged to obtain a relationship between the lateral location of a said wheel and the polarity of said transverse acceleration signal generated by a said accelerometer of a said wheel in response to a lateral turn of said vehicle in a direction of a said lateral side of said vehicle.

19. A wheel identification arrangement according to claim 16, wherein said processor is arranged to determine the lateral location of a said wheel with reference to the polarity of said transverse acceleration signal transmitted by said accelerometer of said wheel upon the vehicle undergoing a said lateral turn.

20. A wheel identification arrangement according to claim 16, further comprising an additional accelerometer mounted on said body, said additional accelerometer being arranged to provide a reference orientation indicating the direction of a said lateral turn for use by said processor.

21. A wheel identification arrangement according to claim 16, wherein said wheels of said vehicle are exchangeable and the wheel identification devices are arranged such that the identity of a said wheel is dependent on its instantaneous location of mounting relative to said vehicle.

22. A wheel identification arrangement according to claim 21, wherein the identity of each said wheel changes upon a change of its mounting position on said vehicle.

23. A wheel identification arrangement according to claim 16, wherein said transverse acceleration signal further contains magnitude information on the magnitude of transverse acceleration of a said wheel relative to said body, and said processor is arranged to detect a steerable wheel with reference to said magnitude information.

24. A wheel identification arrangement according to claim 16, wherein said transverse acceleration signal contains magnitude information indicating the magnitude of transverse acceleration of a said wheel relative to the body of said vehicle; and said processor is arranged to determine whether a wheel is steerable from said magnitude information.

25. A method of according to claim 13, wherein said transverse acceleration signal contains magnitude information indicating the magnitude of transverse acceleration of a said wheel relative to the body of said vehicle; and the method comprises a further step of determining whether a wheel is steerable with reference to said magnitude information.

* * * * *